J. M. HOUFF.
ROPE OR CABLE SECURING DEVICE.
APPLICATION FILED NOV. 7, 1917.

1,262,951.

Patented Apr. 16, 1918.

Inventor
Jacob M. Houff
By
Attorneys

UNITED STATES PATENT OFFICE.

JACOB M. HOUFF, OF MADISON, VIRGINIA, ASSIGNOR OF ONE-HALF TO PETER L. HARGETT, OF FREDERICK, MARYLAND.

ROPE OR CABLE SECURING DEVICE.

1,262,951.

Specification of Letters Patent.

Patented Apr. 16, 1918.

Application filed November 7, 1917. Serial No. 200,711.

*To all whom it may concern:*

Be it known that I, JACOB M. HOUFF, a citizen of the United States, residing at Madison, in the county of Madison and State of Virginia, have invented or discovered certain new and useful Improvements in Rope or Cable Securing Devices, of which the following is a specification, reference being had therein to the accompanying drawings.

This invention relates to devices for securing ropes or cables to objects to which they are to be attached, for example, for securing guy ropes to a structure to be braced thereby, and has for it object the provision of a simple and inexpensive device of this character which will permit the attachment of the rope or cable in a quick and easy manner, which will securely hold said rope or cable in place, and which will transmit the stresses in the rope or cable to the structure at the desired point of application without appreciable eccentric strain tending to distort the securing devices, injure the structure, or loosen the fastening.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise practised without departing from the spirit and scope thereof.

Figure 2:
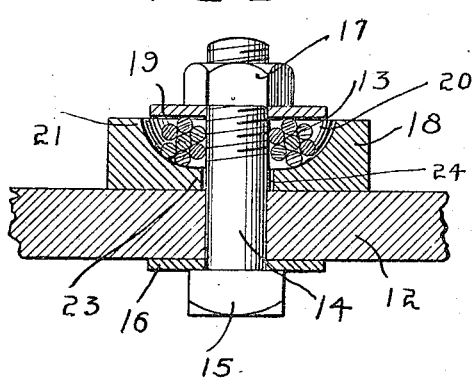
Fig. 2 is a section on the line 2—2, Fig. 1.
Figure 3:
Fig. 3 is an edge view of the cup-shaped base member of the clamp, looking from the bottom in Fig. 1.

12 denotes a wall or other object to which is to be attached a rope or cable 13. Passing loosely through an opening in the wall 12 is a bolt 14 having at one end a head 15 between which and the wall 12 is preferably interposed a washer 16. The opposite end of the bolt 14 is threaded to receive a nut 17, said bolt and nut serving not only to hold the rope or cable clamping devices in operative position with respect to each other, but also to secure them in place upon the wall 12. These clamping devices, which are interposed between the nut 17 and wall 12, comprise a cup-shaped base member 18 and a disk or washer 19. The base member 18 is formed, at its outer or upper side, with a substantially circular, central cavity 20 inclosed by an encircling wall 21. The diameter of the cavity 20 is greatest at its upper or outer portion and decreases downwardly or inwardly, the inner face of the wall 21 being so inclined or curved as to cause opposite portions thereof to converge downwardly, as shown in Fig. 2, so that the diameter of the bottom of said cavity is approximately equal to the diameter of the bolt 14 plus twice the diameter of the rope 13. The wall 21 is provided with an opening or gap 22 the ends of which also converge downwardly or inwardly, the width of the bottom of said gap being approximately equal to twice the diameter of the rope. The bottom wall 23 of the member 18 has therethrough a substantially central aperture 24 through which the bolt 14 loosely passes. The diameter of the washer 19 is less than that of the top or outer portion of the cavity 20, and said washer is loosely mounted on the bolt 14 so as to be freely movable thereon into said cavity.

The device above described is equally suitable for the purpose of securing in place the end of a rope (as indicated in full lines in Fig. 1) or for securing a rope at a point intermediate its ends (as indicated in full and dotted lines in the same figure), as where different portions of the same rope are employed to constitute two guy members extending in different directions from the same point on a braced structure. In order to attach the rope, the nut 17 and washer 19 are removed, the rope looped or doubled upon itself and placed around the bolt 14 within the cavity 20, the adjacent portions passing through the gap 22, and the washer and nut replaced. When the nut 17 is tightened, as by means of a wrench, it is found that the rope is clamped between the washer 19 and the bottom of the cavity 20 with sufficient force to hold the same against substantially any stress within the tensile strength of the rope.

Figure 1:
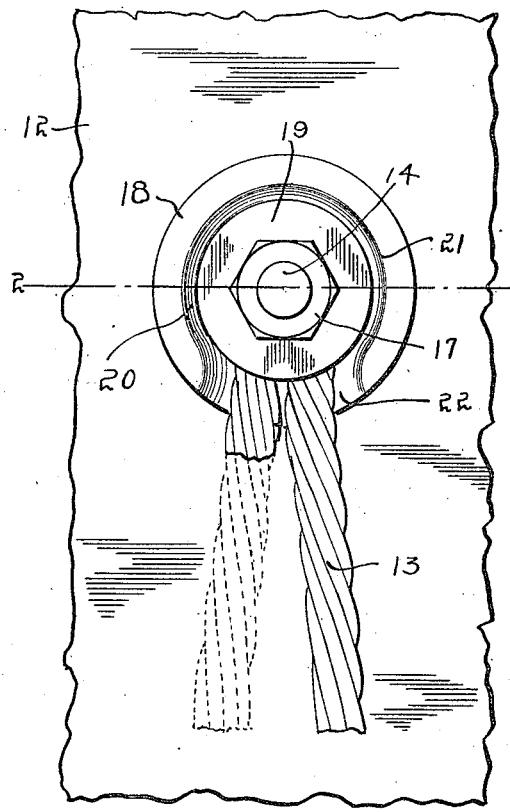
Figure 1 is a face view of the device in place.
Figure 4:
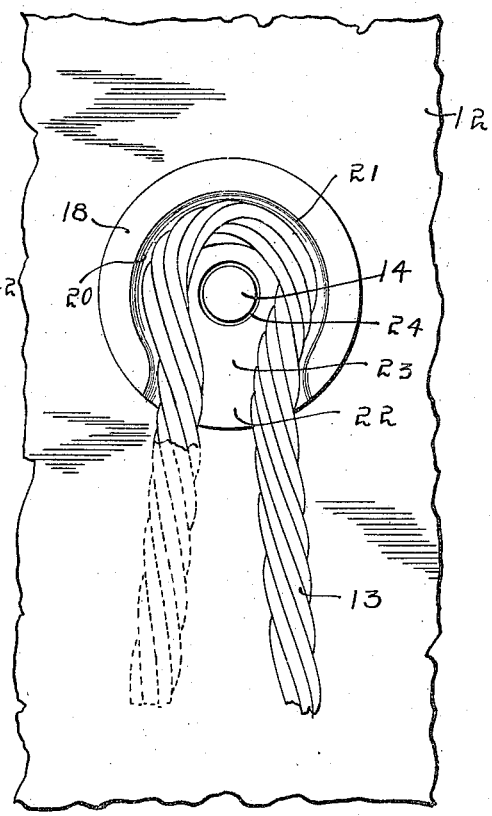
Fig. 4 is a view similar to Fig. 1 with the nut and washer removed, illustrating the introduction of the rope or cable.

In making fast a heavy cable or wire rope it is frequently difficult to bend the same at a sharp angle or into a narrow loop, or otherwise in the manner desired in order to make the fastening. In the use of the present device, however, it is only necessary to bend the rope into a small enough loop to enter the relatively wide outer or upper portion of the cavity 20 (see Fig. 4), and to bring the ends of said loop sufficiently near together to pass through the relatively wide outer or upper portion of the gap 22. Thereafter, when the nut 17 is tightened, the loop is crowded into the relatively narrow or bottom portion of the cavity, and into close engagement with the bolt 14, as shown in Fig. 2, while the adjacent portions of the rope are forced into the relatively narrow portion of the gap 22, and into close engagement with each other, as shown in Fig. 1, this cramping action of the portions of the rope upon each other and upon the parts of the holding device assisting the clamping action above described in securely holding the rope.

For the purpose of securing guy ropes and the like to towers and similar structures it has heretofore been customary to employ eye-bolts, U-bolts, etc. In the use of such devices, however, eccentric stresses are set up which tend to distort the bolts and to wrench them in their openings in the structure, thereby loosening the bolts and injuring the parts of the structure through which they pass. These eccentric stresses are due to the fact that the line of action of the stress in the rope or cable is seldom parallel to the axis of the bolt, while the point of attachment of the rope to the bolt is at an appreciable distance from the desired point of application of the force to the structure, thereby affording a lever arm through which this force acts with the results above referred to. In the device above described, however, it will be seen that, when the rope is clamped in place, the portion thereof which is so clamped occupies a position as close as may be to the theoretically proper point of application to the structure of the force transmitted through the rope, viz: the point of intersection of the axis of the bolt 14 with the plane of the outer face of the wall 12, so that the effect of any eccentric stress is reduced to a minimum.

Having thus described my invention I claim and desire to secure by Letters Patent:

1. A rope or cable securing device comprising a cup-shaped member having an inwardly sloping bottom wall, a central cavity and an encircling wall provided with a single lateral opening or gap, said bottom wall of said member having a substantially central aperture therethrough, a bolt extending through said aperture, a washer loosely mounted on said bolt, and a nut on said bolt beyond said washer.

2. A rope or cable securing device comprising a cup-shaped member having an inwardly sloping bottom wall, a central cavity and an encircling wall provided with a single lateral opening or gap having downwardly converging end walls, the said bottom wall of said member having a substantially central aperture therethrough, a bolt extending through said aperture, a washer loosely mounted on said bolt, and a nut on said bolt beyond said washer.

3. A rope or cable securing device comprising a cup-shaped member having an inwardly sloping bottom wall, a central cavity of inwardly decreasing diameter and an encircling wall provided with a single lateral opening or gap, the bottom wall of said member having a substantially central opening therethrough, a bolt extending through said aperture, a washer loosely mounted on said bolt, and a nut on said bolt beyond said washer.

4. A rope or cable securing device comprising a cup-shaped member having an inwardly sloping bottom wall, a central cavity and an encircling wall provided with a single lateral opening or gap, the said bottom wall of said member having a substantially central aperture therethrough, a bolt extending through said aperture, a washer, of less diameter than the top of said cavity, loosely mounted on said bolt and freely movable thereon into said cavity, and a nut on said bolt beyond said washer.

In testimony whereof I affix my signature.

JACOB M. HOUFF.

Copies of this patent may be obtained for five cents each, by addressing the "Commissioner of Patents, Washington, D. C."